US011587323B2

United States Patent
Israel (10) Patent No.: US 11,587,323 B2
(45) Date of Patent: Feb. 21, 2023

(54) TARGET MODEL BROKER

(71) Applicant: Raytheon Company, Waltham, MA (US)

(72) Inventor: Steven A. Israel, Fairfax, VA (US)

(73) Assignee: Raytheon Company, Waltham, MA (US)

( * ) Notice: Subject to any disclaimer, the term of this patent is extended or adjusted under 35 U.S.C. 154(b) by 18 days.

(21) Appl. No.: 16/874,138

(22) Filed: May 14, 2020

(65) Prior Publication Data

US 2020/0410245 A1 Dec. 31, 2020

Related U.S. Application Data

(60) Provisional application No. 62/868,372, filed on Jun. 28, 2019.

(51) Int. Cl.
*G06V 20/52* (2022.01)
*G06N 3/08* (2006.01)
(Continued)

(52) U.S. Cl.
CPC .............. *G06V 20/52* (2022.01); *G06N 3/08* (2013.01); *G06T 7/80* (2017.01); *G06V 20/13* (2022.01);
(Continued)

(58) Field of Classification Search
CPC ............. G06T 7/80; G06T 2207/10024; G06T 2207/10028; G06T 2207/10032; G06T 2207/20081; G06T 2207/20084; G06K 9/00771; G06K 9/00778; G06K 9/00785; G06V 10/454; G06V 10/443; G06V 10/82; G06V 10/80; G06V 20/13; G06V 20/10;
(Continued)

(56) References Cited

U.S. PATENT DOCUMENTS 8,077,358 B2 * 12/2011 Banton .............. H04N 1/00063
358/3.24
10,846,552 B1 11/2020 Wu et al.
(Continued)

OTHER PUBLICATIONS

U.S. Appl. No. 16/506,218, filed Jul. 9, 2019, Architecture for Improved Machine Learning Operation.
(Continued)

*Primary Examiner* — Sean M Conner
*Assistant Examiner* — Stephen M Brinich
(74) *Attorney, Agent, or Firm* — Schwegman Lundberg & Woessner, P.A.

(57) ABSTRACT

A machine accesses a set of image target models, each image target model being associated with model parameters, the model parameters comprising at least an operational domain, an expected input image quality, and an expected orientation. The machine receives an image for processing by one or more image target models from the set, the image including metadata specifying image parameters of the received image. The machine identifies, based on the image parameters in the metadata of the received image and the model parameters of one or more models in the set, a first subset of the set of image target models including image target models that are capable of processing the received image. The machine provides the received image to at least one image target model in the first subset.

19 Claims, 8 Drawing Sheets

(51) Int. Cl.
*G06T 7/80* (2017.01)
*G06V 20/13* (2022.01)

(52) U.S. Cl.
CPC .............. *G06T 2207/10032* (2013.01); *G06T 2207/20081* (2013.01); *G06T 2207/20084* (2013.01)

(58) Field of Classification Search
CPC ........ G06V 20/17; G06V 20/52; G06V 20/50; G06V 20/53
USPC .................... 382/103, 100, 112, 215–217
See application file for complete search history.

(56) References Cited

U.S. PATENT DOCUMENTS

| | | | |
|---|---|---|---|
| 2005/0013486 A1* | 1/2005 | Wiedemann | G06K 9/6857 382/181 |
| 2014/0267381 A1 | 9/2014 | Young | |
| 2015/0281572 A1* | 10/2015 | Pongratz | G06T 5/002 348/207.1 |
| 2017/0053169 A1* | 2/2017 | Cuban | B64C 39/024 |
| 2018/0040140 A1* | 2/2018 | Rozenberg | G06K 9/46 |
| 2018/0068421 A1* | 3/2018 | Mori | G06T 5/002 |
| 2019/0147301 A1 | 5/2019 | Farfade et al. | |
| 2019/0294703 A1 | 9/2019 | Bolin et al. | |
| 2019/0369731 A1* | 12/2019 | Verbeke | H04R 1/323 |
| 2020/0175408 A1* | 6/2020 | Baughman | G06N 3/04 |
| 2020/0184623 A1* | 6/2020 | Price | G06N 3/02 |
| 2020/0196015 A1* | 6/2020 | Pate | H04N 21/8583 |
| 2021/0012477 A1 | 1/2021 | Israel | |

OTHER PUBLICATIONS

"U.S. Appl. No. 16/506,218, Corrected Notice of Allowability dated Apr. 26, 2021", 2 pgs.

"U.S. Appl. No. 16/506,218, Examiner Interview Summary dated Feb. 18, 2021", 2 pgs.

"U.S. Appl. No. 16/506,218, Non Final Office Action dated Dec. 11, 2020", 13 pgs.

"U.S. Appl. No. 16/506,218, Notice of Allowance dated Apr. 7, 2021", 7 pgs.

"U.S. Appl. No. 16/506,218, Response filed Mar. 10, 2021 to Non Final Office Action dated Dec. 11, 2020", 11 pgs.

Gutchess, Daniel, et al., "Predicting the Effectiveness of SAR Imagery for Target Detection", Proceedings of SPIE vol. 8051, [Online]. Retrieved from the Internet: <URL: https://www.spiedigitallibrary.org/conference-proceedings-of-spie on Feb. 26, 2019>, (2011), 1-12.

Reulke, Ralf, et al., "Image Quality and Image Resolution", Seventh International Conference on Sensing Technology, (2013), 686-689.

* cited by examiner

TARGET MODEL BROKER

PRIORITY CLAIM

This application claims priority to U.S. Provisional Patent Application No. 62/868,372, filed on Jun. 28, 2019, by inventor Steven Israel, titled "TARGET MODEL BROKER," the entire disclosure of which is incorporated herein by reference.

RELATED APPLICATION

This application relates to U.S. patent application Ser. No. 16/506,218, filed on Jul. 9, 2019, by inventor Steven Israel, titled "ARCHITECTURE FOR IMPROVED MACHINE LEARNING OPERATION," the entire disclosure of which is incorporated herein by reference.

TECHNICAL FIELD

Embodiments pertain to computer architecture. Some embodiments relate to image target models. Some embodiments relate to a target model broker that selects at least one image target model from a set of image target models.

BACKGROUND

Image target models include neural network and other models that identify target(s) within image(s). In recent years, many such image target models have been developed. Identifying optimal image target model(s) for identifying target(s) within a given image and/or being trained using the given image may be desirable.

SUMMARY

The present disclosure generally relates to machines configured to provide image target models, including computerized variants of such special-purpose machines and improvements to such variants, and to the technologies by which such special-purpose machines become improved compared to other special-purpose machines that provide technology for pattern recognition algorithms (e.g., neural networks, statistical algorithms, and the like). In particular, the present disclosure addresses an image target model broker.

According to some aspects of the technology described herein, an image target model brokering apparatus include processing circuitry and memory. The processing circuitry accesses a set of image target models, each image target model being associated with model parameters, the model parameters comprising at least an operational domain, an expected input image quality, and an expected orientation. The processing circuitry receives an image for processing by one or more image target models from the set, the image including metadata specifying image parameters of the received image. The processing circuitry identifies, based on the image parameters in the metadata of the received image and the model parameters of one or more models in the set, a first subset of the set of image target models including image target models that are capable of processing the received image. The processing circuitry provides the received image to at least one image target model in the first subset.

Other aspects include a method to perform the operations of the processing circuitry above, and a machine-readable medium storing instructions for the processing circuitry to perform the above operations.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

As discussed above, image target models include neural network and other algorithms that identify target(s) within image(s). In recent years, many such image target models have been developed. Identifying optimal image target model(s) for identifying target(s) within a given image and/or being trained using the given image may be desirable.

Pattern recognition models, particularly neural networks, return an answer regardless whether the input is related to the model. For example, a pattern recognition model may be trained to identify a tank in an image using a training dataset comprising land-based scenes. The trained model then attempts to identify a tank (and provides an output indicating whether and where there is a tank) in any input image—regardless of whether the input image depicts a land-based scene, a sea-based scene, or a teddy bear. This may result in a mistake where the input image is sufficiently different from the images in the training dataset. For example, in processing the image of the teddy bear, the trained model may mistake the teddy bear's nose for a tank. Some models are generated by multiple non-collaborative developers, increasing the probability of a spurious answer (e.g., the tank in the picture of the teddy bear). In some cases, an image target model broker filters data relevant to the specific pattern recognition model(s) that are passed to it. The result is a significant mitigation to spurious results and expected improved human adjudicator confidence. Those filters contain data quality parameters associate with the National Imagery Interpretation Rating Scale (NIIRS) and include ground sampled distance, target to background contrast, and enhancement artifacts.

According to some aspects of the technology described herein, a computing machine (or a combination of multiple machines) accesses a set of image target models. Each image target model is associated with model parameters specifying the image(s) that are capable of being processed by the image target model. The model parameters may include at least an operational domain, an expected input image quality, and an expected orientation. The computing machine receives an image for processing by one or more image target models from the set. The image includes metadata specifying image parameters of the received image. The image parameters may include at least a geographic location, an image quality, and a viewing orientation. The computing machine identifies, based on the image parameters in the metadata of the received image and the model parameters of one or more models in the set, a first subset of the set of image target models including image target models that are capable of processing the received image. The computing machine provides the received image to at least one image target model in the first subset.

In some cases, the image target model(s) include neural network(s) or other types of machine learning algorithm. The received image may be used for training and/or inference by the image target model(s) in the first subset.

As used herein, the term "computing machine" may include a single computing machine or multiple computing machines. A computing machine may include any device or combination of devices that includes processing circuitry and memory. The processing circuitry and the memory may reside in the same device or in different devices.

Figure 1:
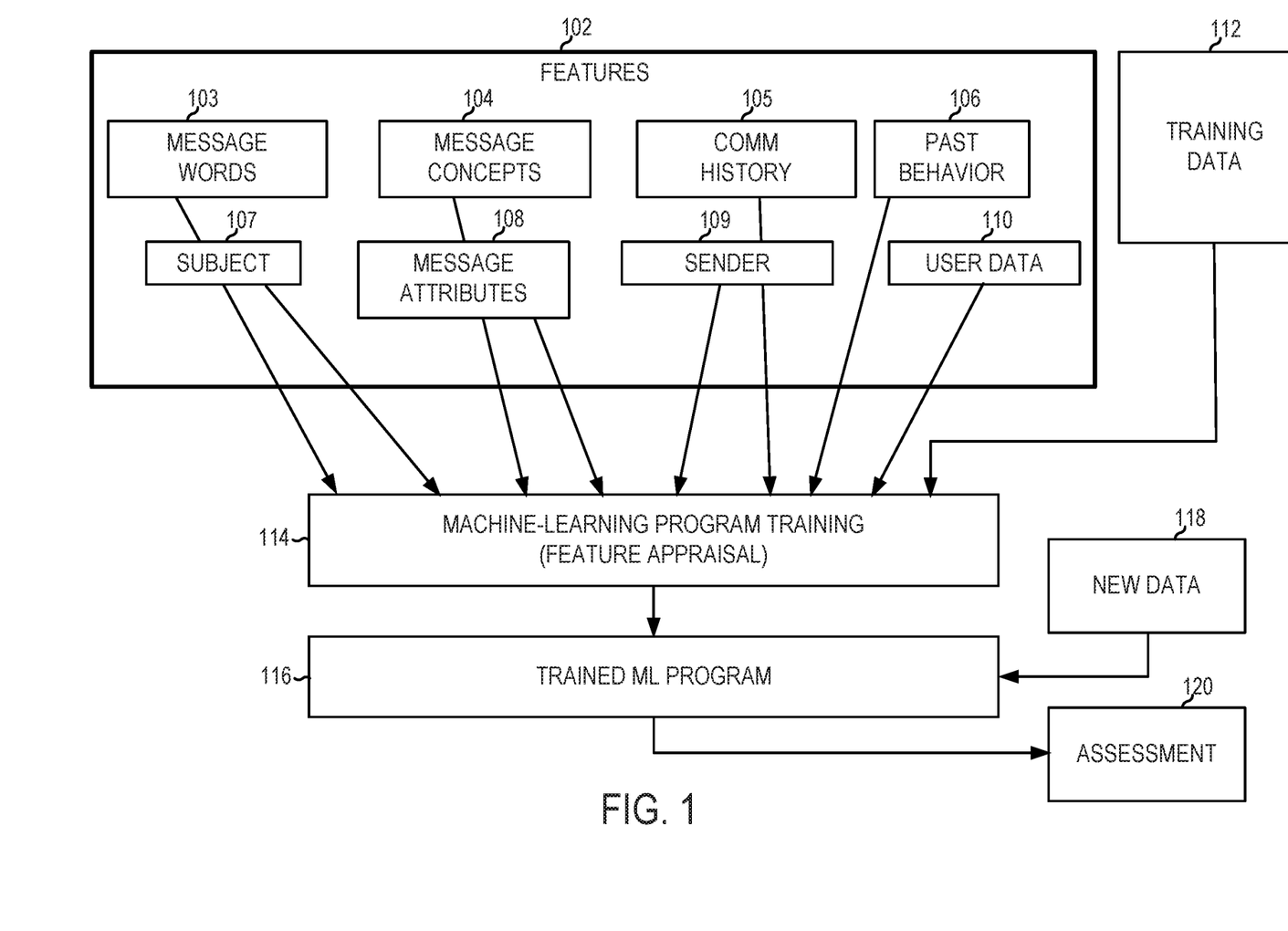
FIG. 1 illustrates the training and use of a machine-learning program, in accordance with some embodiments.

FIG. 1 illustrates the training and use of a machine-learning program, according to some example embodiments. In some example embodiments, machine-learning programs (MLPs), also referred to as machine-learning algorithms or tools, are utilized to perform operations associated with machine learning tasks, such as image recognition or machine translation.

Machine learning is a field of study that gives computers the ability to learn without being explicitly programmed. Machine learning explores the study and construction of algorithms, also referred to herein as tools, which may learn from existing data and make predictions about new data. Such machine-learning tools operate by building a model from example training data 112 in order to make data-driven predictions or decisions expressed as outputs or assessments 120. Although example embodiments are presented with respect to a few machine-learning tools, the principles presented herein may be applied to other machine-learning tools.

In some example embodiments, different machine-learning tools may be used. For example, Logistic Regression (LR), Naive-Bayes, Random Forest (RF), neural networks (NN), matrix factorization, and Support Vector Machines (SVM) tools may be used for classifying or scoring job postings.

Two common types of problems in machine learning are classification problems and regression problems. Classification problems, also referred to as categorization problems, aim at classifying items into one of several category values (for example, is this object an apple or an orange). Regression algorithms aim at quantifying some items (for example, by providing a value that is a real number). The machine-learning algorithms utilize the training data 112 to find correlations among identified features 102 that affect the outcome.

The machine-learning algorithms utilize features 102 for analyzing the data to generate assessments 120. A feature 102 is an individual measurable property of a phenomenon being observed. The concept of a feature is related to that of an explanatory variable used in statistical techniques such as linear regression. Choosing informative, discriminating, and independent features is important for effective operation of the MLP in pattern recognition, classification, and regression. Features may be of different types, such as numeric features, strings, and graphs.

In one example embodiment, the features 102 may be of different types and may include one or more of words of the message 103, message concepts 104, communication history 105, past user behavior 106, subject of the message 107, other message attributes 108, sender 109, and user data 110.

The machine-learning algorithms utilize the training data 112 to find correlations among the identified features 102 that affect the outcome or assessment 120. In some example embodiments, the training data 112 includes labeled data, which is known data for one or more identified features 102 and one or more outcomes, such as detecting communication patterns, detecting the meaning of the message, generating a summary of the message, detecting action items in the message, detecting urgency in the message, detecting a relationship of the user to the sender, calculating score attributes, calculating message scores, etc.

With the training data 112 and the identified features 102, the machine-learning tool is trained at operation 114. The machine-learning tool appraises the value of the features 102 as they correlate to the training data 112. The result of the training is the trained machine-learning program 116.

When the machine-learning program 116 is used to perform an assessment, new data 118 is provided as an input to the trained machine-learning program 116, and the machine-learning program 116 generates the assessment 120 as output. For example, the machine-learning program 116 may be asked to count the number of sedans and pickup trucks in a parking lot between 10:00 and 11:00. The machine-learning program 116 determines the required image quality to extract the information that is needed. The machine-learning program 116 determines if a target model exists for sedans and pickup trucks. The machine-learning program 116 locates images having the required image quality to extract the information that is needed. If such images do not exist for the given time and geographic location parameters, the machine-learning program 116 requests collection of such images for the given time and geographic location parameters. Upon receiving the requested or located images, the machine-learning program 116 pushes the images to the appropriate model.

Machine learning techniques train models to accurately make predictions on data fed into the models. During a learning phase, the models are developed against a training dataset of inputs to optimize the models to correctly predict the output for a given input. Generally, the learning phase may be supervised, semi-supervised, or unsupervised; indicating a decreasing level to which the "correct" outputs are provided in correspondence to the training inputs. In a supervised learning phase, all of the outputs are provided to the model and the model is directed to develop a general rule or algorithm that maps the input to the output. In contrast, in an unsupervised learning phase, the desired output is not provided for the inputs so that the model may develop its own rules to discover relationships within the training dataset. In a semi-supervised learning phase, an incompletely labeled training set is provided, with some of the outputs known and some unknown for the training dataset.

Models may be run against a training dataset for several epochs (e.g., iterations), in which the training dataset is repeatedly fed into the model to refine its results. For example, in a supervised learning phase, a model is developed to predict the output for a given set of inputs, and is evaluated over several epochs to more reliably provide the output that is specified as corresponding to the given input for the greatest number of inputs for the training dataset. In another example, for an unsupervised learning phase, a model is developed to cluster the dataset into n groups, and is evaluated over several epochs as to how consistently it places a given input into a given group and how reliably it produces the n desired clusters across each epoch.

Once an epoch is run, the models are evaluated and the values of their variables are adjusted to attempt to better refine the model in an iterative fashion. In various aspects, the evaluations are biased against false negatives, biased against false positives, or evenly biased with respect to the overall accuracy of the model. The values may be adjusted in several ways depending on the machine learning technique used. For example, in a genetic or evolutionary algorithm, the values for the models that are most successful in predicting the desired outputs are used to develop values for models to use during the subsequent epoch, which may include random variation/mutation to provide additional data points. One of ordinary skill in the art will be familiar with several other machine learning algorithms that may be applied with the present disclosure, including linear regression, random forests, decision tree learning, neural networks, deep neural networks, etc.

Each model develops a rule or algorithm over several epochs by varying the values of one or more variables affecting the inputs to more closely map to a desired result, but as the training dataset may be varied, and is preferably very large, perfect accuracy and precision may not be achievable. A number of epochs that make up a learning phase, therefore, may be set as a given number of trials or a fixed time/computing budget, or may be terminated before that number/budget is reached when the accuracy of a given model is high enough or low enough or an accuracy plateau has been reached. For example, if the training phase is designed to run n epochs and produce a model with at least 95% accuracy, and such a model is produced before the $n^{th}$ epoch, the learning phase may end early and use the produced model satisfying the end-goal accuracy threshold. Similarly, if a given model is inaccurate enough to satisfy a random chance threshold (e.g., the model is only 55% accurate in determining true/false outputs for given inputs), the learning phase for that model may be terminated early, although other models in the learning phase may continue training. Similarly, when a given model continues to provide similar accuracy or vacillate in its results across multiple epochs—having reached a performance plateau—the learning phase for the given model may terminate before the epoch number/computing budget is reached.

Once the learning phase is complete, the models are finalized. In some example embodiments, models that are finalized are evaluated against testing criteria. In a first example, a testing dataset that includes known outputs for its inputs is fed into the finalized models to determine an accuracy of the model in handling data that is has not been trained on. In a second example, a false positive rate or false negative rate may be used to evaluate the models after finalization. In a third example, a delineation between data clusterings is used to select a model that produces the clearest bounds for its clusters of data.

Figure 2:
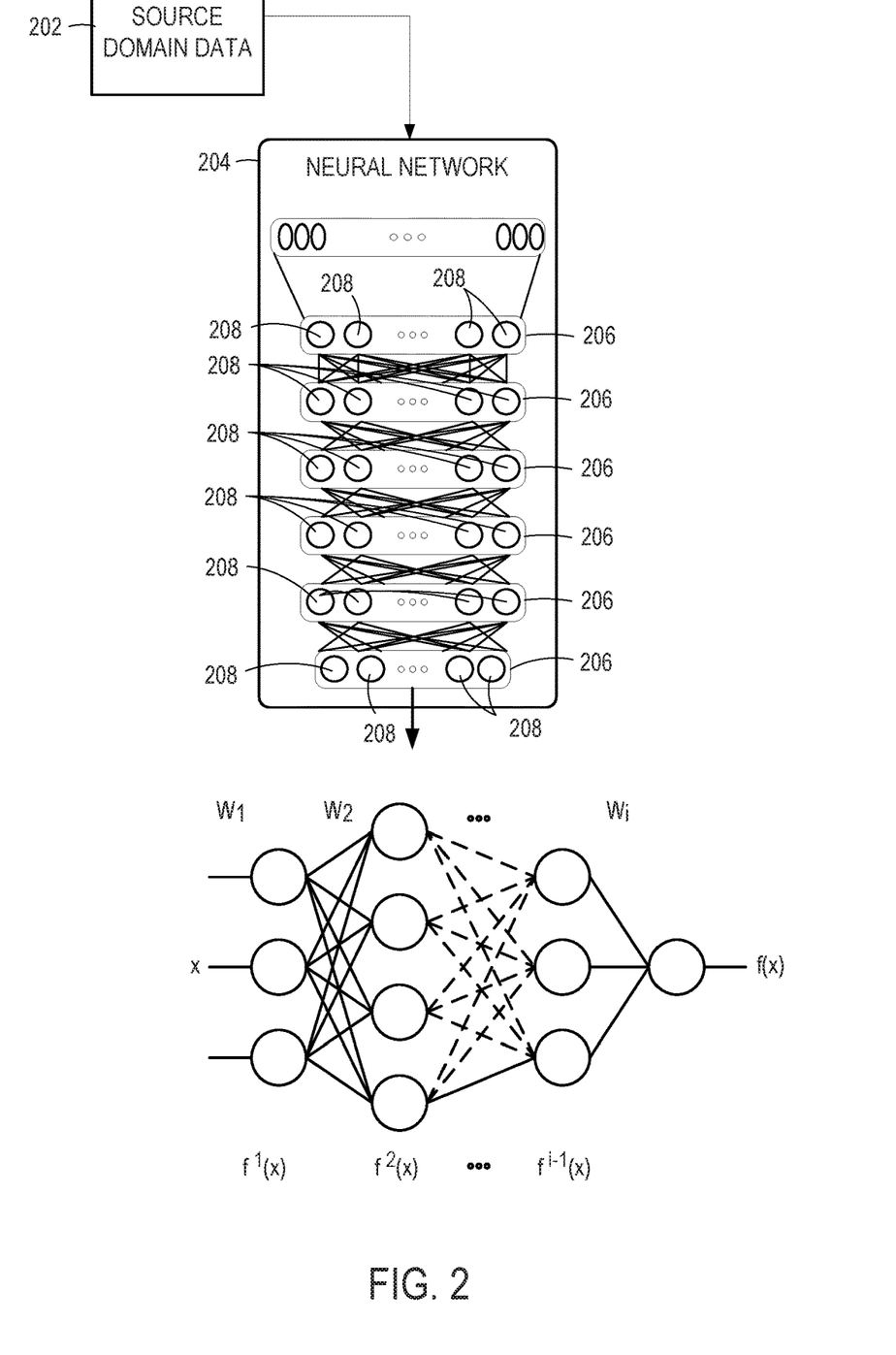
FIG. 2 illustrates an example neural network, in accordance with some embodiments.

FIG. 2 illustrates an example neural network 204, in accordance with some embodiments. As shown, the neural network 204 receives, as input, source domain data 202. The input is passed through a plurality of layers 206 to arrive at an output. Each layer 206 includes multiple neurons 208. The neurons 208 receive input from neurons of a previous layer and apply weights to the values received from those neurons in order to generate a neuron output. The neuron outputs from the final layer 206 are combined to generate the output of the neural network 204.

As illustrated at the bottom of FIG. 2, the input is a vector x. The input is passed through multiple layers 206, where weights $W_1$, $W_2$, are applied to the input to each layer to arrive at $f^1(x)$, $f^2(x)$, ..., $f^{i-1}(x)$, until finally the output $f(x)$ is computed.

In some example embodiments, the neural network 204 (e.g., deep learning, deep convolutional, or recurrent neural network) comprises a series of neurons 208. A neuron 208 is an architectural element used in data processing and artificial intelligence, particularly machine learning on the weights of inputs provided to the given neuron 208. Each of the neurons 208 used herein are configured to accept a predefined number of inputs from other neurons 208 in the neural network 204 to provide relational and sub-relational outputs for the content of the frames being analyzed. Individual neurons 208 may be chained together and/or organized in various configurations of neural networks to provide interactions and relationship learning modeling for how each of the frames in an utterance are related to one another.

For example, a neural network node serving as a neuron includes several gates to handle input vectors (e.g., sections of an image), a memory cell, and an output vector (e.g., contextual representation). The input gate and output gate control the information flowing into and out of the memory cell, respectively. Weights and bias vectors for the various gates are adjusted over the course of a training phase, and once the training phase is complete, those weights and biases are finalized for normal operation. One of skill in the art will appreciate that neurons and neural networks may be constructed programmatically (e.g., via software instructions) or via specialized hardware linking each neuron to form the neural network.

Neural networks utilize features for analyzing the data to generate assessments (e.g., patterns in an image). A feature is an individual measurable property of a phenomenon being observed. The concept of feature is related to that of an explanatory variable used in statistical techniques such as linear regression. Further, deep features represent the output of nodes in hidden layers of the deep neural network.

A neural network, sometimes referred to as an artificial neural network, is a computing system/apparatus based on consideration of biological neural networks of animal brains. Such systems/apparatus progressively improve performance, which is referred to as learning, to perform tasks, typically without task-specific programming. For example, in image recognition, a neural network may be taught to identify images that contain an object by analyzing example images that have been tagged with a name for the object and, having learnt the object and name, may use the analytic results to identify the object in untagged images. A neural network is based on a collection of connected units called neurons, where each connection, called a synapse, between neurons can transmit a unidirectional signal with an activating strength that varies with the strength of the connection. The receiving neuron can activate and propagate a signal to downstream neurons connected to it, typically based on whether the combined incoming signals, which are from potentially many transmitting neurons, are of sufficient strength, where strength is a parameter.

A deep neural network (DNN) is a stacked neural network, which is composed of multiple layers. The layers are composed of nodes, which are locations where computation occurs, loosely patterned on a neuron in the human brain, which fires when it encounters sufficient stimuli. A node combines input from the data with a set of coefficients, or weights, that either amplify or dampen that input, which assigns significance to inputs for the task the algorithm is trying to learn. These input-weight products are summed, and the sum is passed through what is called a node's activation function, to determine whether and to what extent that signal progresses further through the network to affect the ultimate outcome. A DNN uses a cascade of many layers of non-linear processing units for feature extraction and transformation. Each successive layer uses the output from the previous layer as input. Higher-level features are derived from lower-level features to form a hierarchical representation. The layers following the input layer may be convolution layers that produce feature maps that are filtering results of the inputs and are used by the next convolution layer.

In training of a DNN architecture, a regression, which is structured as a set of statistical processes for estimating the relationships among variables, can include a minimization of a cost function. The cost function may be implemented as a function to return a number representing how well the neural network performed in mapping training examples to correct output. In training, if the cost function value is not within a pre-determined range, based on the known training images, backpropagation is used, where backpropagation is a common method of training artificial neural networks that are used with an optimization method such as a stochastic gradient descent (SGD) method.

Use of backpropagation can include propagation and weight update. When an input is presented to the neural network, it is propagated forward through the neural network, layer by layer, until it reaches the output layer. The output of the neural network is then compared to the desired output, using the cost function, and an error value is calculated for each of the nodes in the output layer. The error values are propagated backwards, starting from the output, until each node has an associated error value which roughly represents its contribution to the original output. Backpropagation can use these error values to calculate the gradient of the cost function with respect to the weights in the neural network. The calculated gradient is fed to the selected optimization method to update the weights to attempt to minimize the cost function.

Figure 3:
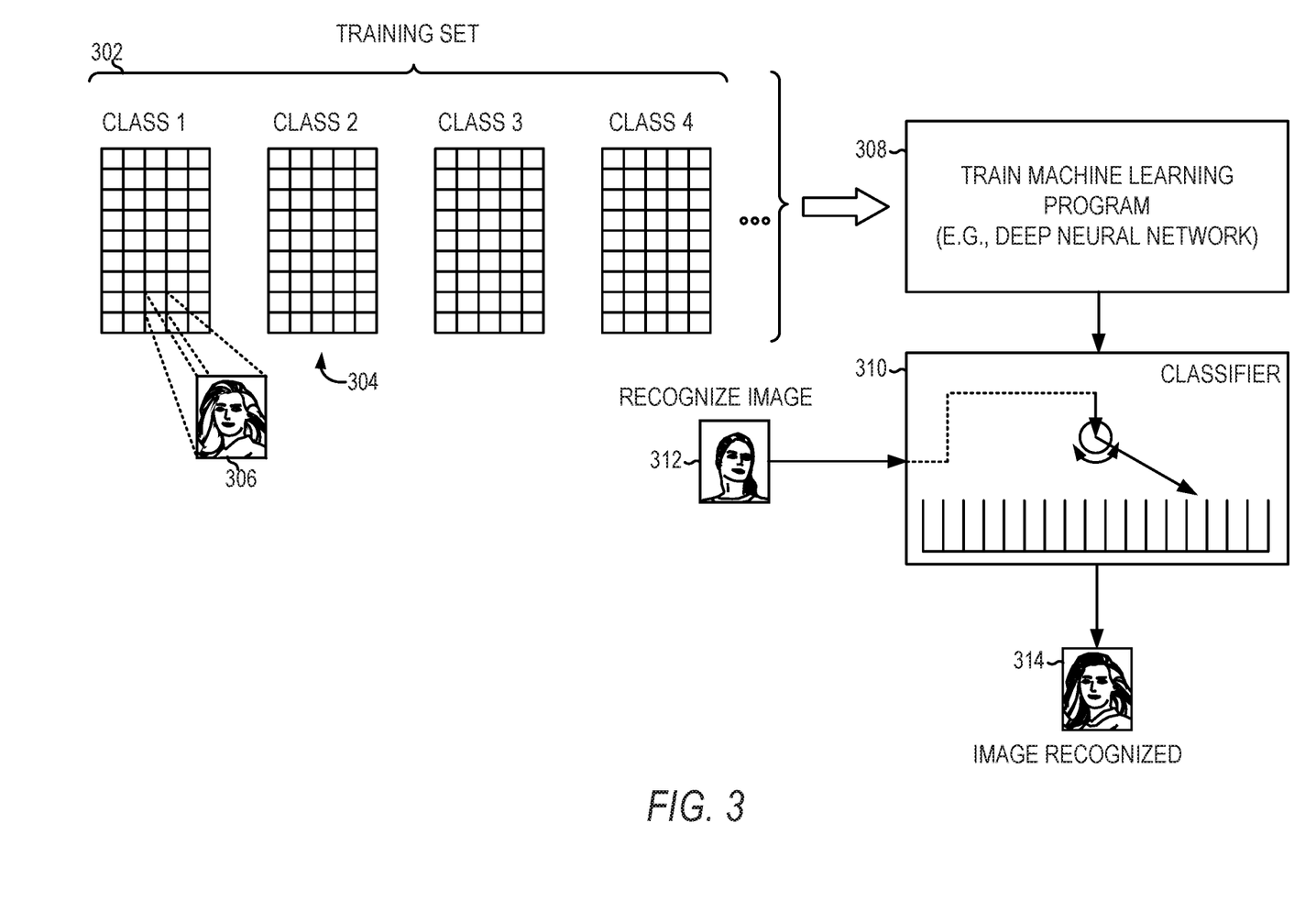
FIG. 3 illustrates the training of an image recognition machine learning program, in accordance with some embodiments.

FIG. 3 illustrates the training of an image recognition machine learning program, in accordance with some embodiments. The machine learning program may be implemented at one or more computing machines. Block 302 illustrates a training set, which includes multiple classes 304. Each class 304 includes multiple images 306 associated with the class. Each class 304 may correspond to a type of object in the image 306 (e.g., a digit 0-9, a man or a woman, a cat or a dog, etc.). In one example, the machine learning program is trained to recognize images of the presidents of the United States, and each class corresponds to each president (e.g., one class corresponds to Donald Trump, one class corresponds to Barack Obama, one class corresponds to George W. Bush, etc.). At block 308 the machine learning program is trained, for example, using a deep neural network. At block 310, the trained classifier, generated by the training of block 308, recognizes an image 312, and at block 314 the image is recognized. For example, if the image 312 is a photograph of Bill Clinton, the classifier recognizes the image as corresponding to Bill Clinton at block 314.

FIG. 3 illustrates the training of a classifier, according to some example embodiments. A machine learning algorithm is designed for recognizing faces, and a training set 302 includes data that maps a sample to a class 304 (e.g., a class includes all the images of purses). The classes may also be referred to as labels. Although embodiments presented herein are presented with reference to object recognition, the same principles may be applied to train machine-learning programs used for recognizing any type of items.

The training set 302 includes a plurality of images 306 for each class 304 (e.g., image 306), and each image is associated with one of the categories to be recognized (e.g., a class). The machine learning program is trained 308 with the training data to generate a classifier 310 operable to recognize images. In some example embodiments, the machine learning program is a DNN.

When an input image 312 is to be recognized, the classifier 310 analyzes the input image 312 to identify the class (e.g., class 314) corresponding to the input image 312.

Figure 4:
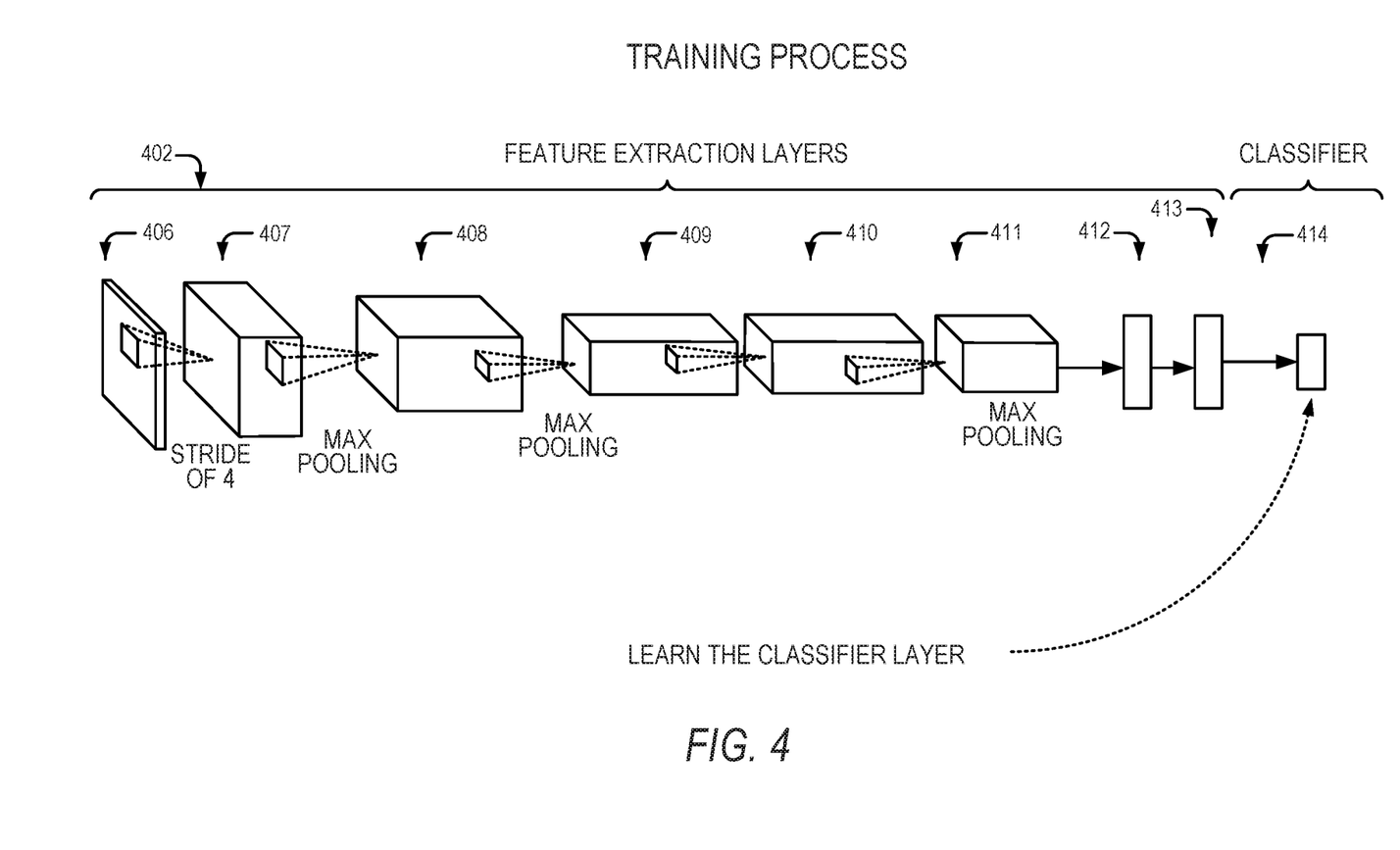
FIG. 4 illustrates the feature-extraction process and classifier training, in accordance with some embodiments.

FIG. 4 illustrates the feature-extraction process and classifier training, according to some example embodiments. Training the classifier may be divided into feature extraction layers 402 and classifier layer 414. Each image is analyzed in sequence by a plurality of layers 406-413 in the feature-extraction layers 402.

With the development of deep convolutional neural networks, the focus in face recognition has been to learn a good face feature space, in which faces of the same person are close to each other, and faces of different persons are far away from each other. For example, the verification task with the LFW (Labeled Faces in the Wild) dataset has been often used for face verification.

Many face identification tasks (e.g., MegaFace and LFW) are based on a similarity comparison between the images in the gallery set and the query set, which is essentially a K-nearest-neighborhood (KNN) method to estimate the person's identity. In the ideal case, there is a good face feature extractor (inter-class distance is always larger than the intra-class distance), and the KNN method is adequate to estimate the person's identity.

Feature extraction is a process to reduce the amount of resources required to describe a large set of data. When performing analysis of complex data, one of the major problems stems from the number of variables involved. Analysis with a large number of variables generally requires a large amount of memory and computational power, and it may cause a classification algorithm to overfit to training samples and generalize poorly to new samples. Feature extraction is a general term describing methods of constructing combinations of variables to get around these large data-set problems while still describing the data with sufficient accuracy for the desired purpose.

In some example embodiments, feature extraction starts from an initial set of measured data and builds derived values (features) intended to be informative and non-redundant, facilitating the subsequent learning and generalization steps. Further, feature extraction is related to dimensionality reduction, such as be reducing large vectors (sometimes with very sparse data) to smaller vectors capturing the same, or similar, amount of information.

Determining a subset of the initial features is called feature selection. The selected features are expected to contain the relevant information from the input data, so that the desired task can be performed by using this reduced representation instead of the complete initial data. DNN utilizes a stack of layers, where each layer performs a function. For example, the layer could be a convolution, a non-linear transform, the calculation of an average, etc. Eventually this DNN produces outputs by classifier 414. In FIG. 4, the data travels from left to right and the features are extracted. The goal of training the neural network is to find the parameters of all the layers that make them adequate for the desired task.

As shown in FIG. 4, a "stride of 4" filter is applied at layer 406, and max pooling is applied at layers 407-413. The stride controls how the filter convolves around the input volume. "Stride of 4" refers to the filter convolving around the input volume four units at a time. Max pooling refers to down-sampling by selecting the maximum value in each max pooled region.

In some example embodiments, the structure of each layer is predefined. For example, a convolution layer may contain small convolution kernels and their respective convolution parameters, and a summation layer may calculate the sum, or the weighted sum, of two pixels of the input image. Training assists in defining the weight coefficients for the summation.

One way to improve the performance of DNNs is to identify newer structures for the feature-extraction layers, and another way is by improving the way the parameters are identified at the different layers for accomplishing a desired task. The challenge is that for a typical neural network, there may be millions of parameters to be optimized. Trying to optimize all these parameters from scratch may take hours, days, or even weeks, depending on the amount of computing resources available and the amount of data in the training set.

Figure 5:
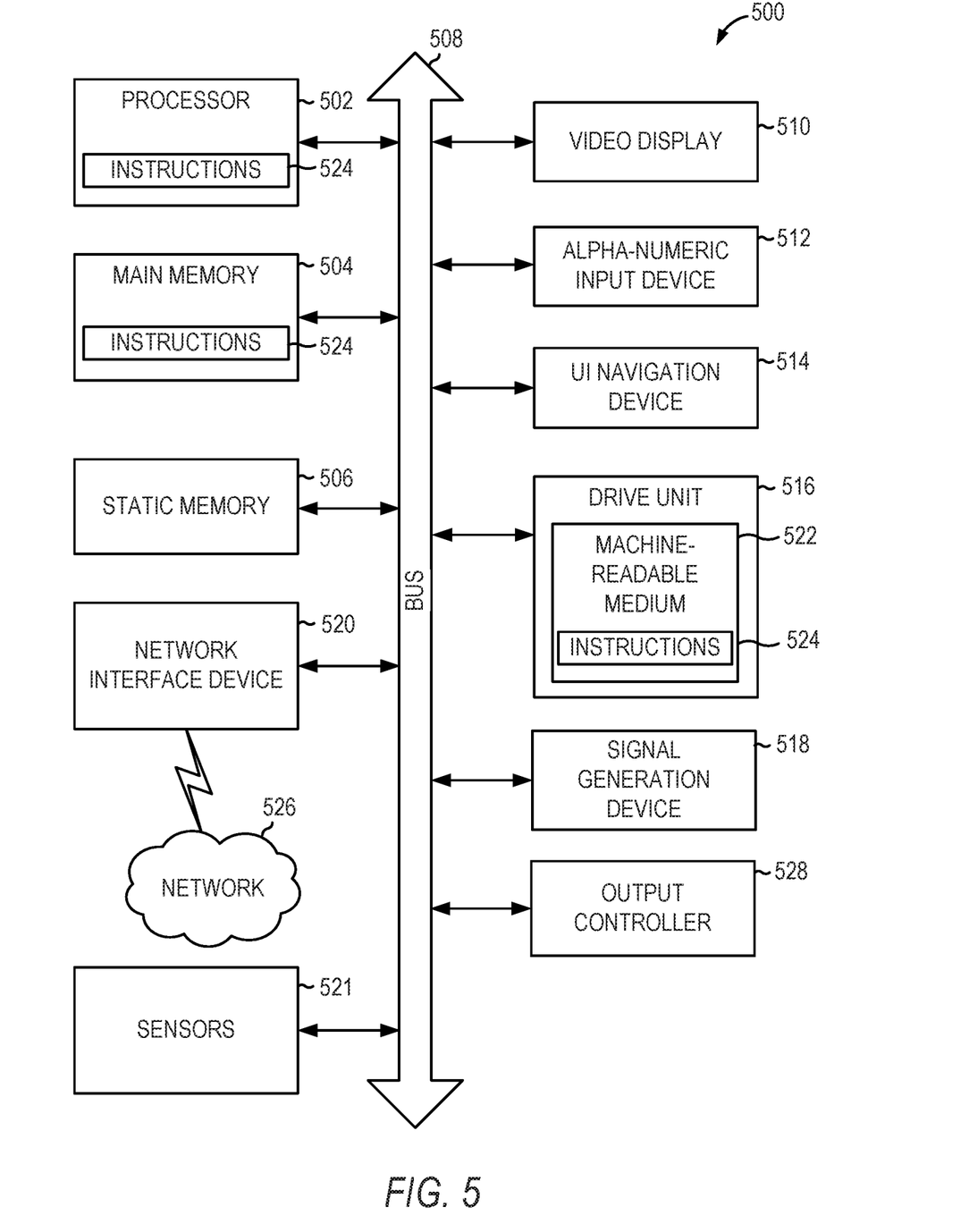
FIG. 5 is a block diagram of a computing machine, in accordance with some embodiments.

FIG. 5 illustrates a circuit block diagram of a computing machine 500 in accordance with some embodiments. In some embodiments, components of the computing machine 500 may store or be integrated into other components shown in the circuit block diagram of FIG. 5. For example, portions of the computing machine 500 may reside in the processor 502 and may be referred to as "processing circuitry." Processing circuitry may include processing hardware, for example, one or more central processing units (CPUs), one or more graphics processing units (GPUs), and the like. In alternative embodiments, the computing machine 500 may operate as a standalone device or may be connected (e.g., networked) to other computers. In a networked deployment, the computing machine 500 may operate in the capacity of a server, a client, or both in server-client network environments. In an example, the computing machine 500 may act as a peer machine in peer-to-peer (P2P) (or other distributed) network environment. In this document, the phrases P2P, device-to-device (D2D) and sidelink may be used interchangeably. The computing machine 500 may be a specialized computer, a personal computer (PC), a tablet PC, a personal digital assistant (PDA), a mobile telephone, a smart phone, a web appliance, a network router, switch or bridge, or any machine capable of executing instructions (sequential or otherwise) that specify actions to be taken by that machine.

Examples, as described herein, may include, or may operate on, logic or a number of components, modules, or mechanisms. Modules and components are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems/apparatus (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" (and "component") is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The computing machine 500 may include a hardware processor 502 (e.g., a central processing unit (CPU), a GPU, a hardware processor core, or any combination thereof), a main memory 504 and a static memory 506, some or all of which may communicate with each other via an interlink (e.g., bus) 508. Although not shown, the main memory 504 may contain any or all of removable storage and non-removable storage, volatile memory or non-volatile memory. The computing machine 500 may further include a video display unit 510 (or other display unit), an alphanumeric input device 512 (e.g., a keyboard), and a user interface (UI) navigation device 514 (e.g., a mouse). In an example, the display unit 510, input device 512 and UI navigation device 514 may be a touch screen display. The computing machine 500 may additionally include a storage device (e.g., drive unit) 516, a signal generation device 518 (e.g., a speaker), a network interface device 520, and one or more sensors 521, such as a global positioning system (GPS) sensor, compass, accelerometer, or other sensor. The computing machine 500 may include an output controller 528, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The drive unit 516 (e.g., a storage device) may include a machine readable medium 522 on which is stored one or more sets of data structures or instructions 524 (e.g., software) embodying or utilized by any one or more of the techniques or functions described herein. The instructions 524 may also reside, completely or at least partially, within the main memory 504, within static memory 506, or within the hardware processor 502 during execution thereof by the computing machine 500. In an example, one or any combination of the hardware processor 502, the main memory 504, the static memory 506, or the storage device 516 may constitute machine readable media.

While the machine readable medium 522 is illustrated as a single medium, the term "machine readable medium" may include a single medium or multiple media (e.g., a centralized or distributed database, and/or associated caches and servers) configured to store the one or more instructions 524.

The term "machine readable medium" may include any medium that is capable of storing, encoding, or carrying instructions for execution by the computing machine 500 and that cause the computing machine 500 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 524 may further be transmitted or received over a communications network 526 using a transmission medium via the network interface device 520 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 520 may include one or more physical jacks (e.g., Ethernet, coaxial, or phone jacks) or one or more antennas to connect to the communications network 526.

The technology disclosed herein uses various engines, each of which is constructed, programmed, configured, or otherwise adapted, to carry out a function or set of functions. The term "engine" as used herein means a tangible device, component, or arrangement of components implemented using hardware, such as by an application specific integrated circuit (ASIC) or field-programmable gate array (FPGA), for example, or as a combination of hardware and software, such as by a processor-based computing platform and a set of program instructions that transform the computing platform into a special-purpose device to implement the particular functionality. An engine may also be implemented as a combination of the two, with certain functions facilitated by hardware alone, and other functions facilitated by a combination of hardware and software.

Figure 6:
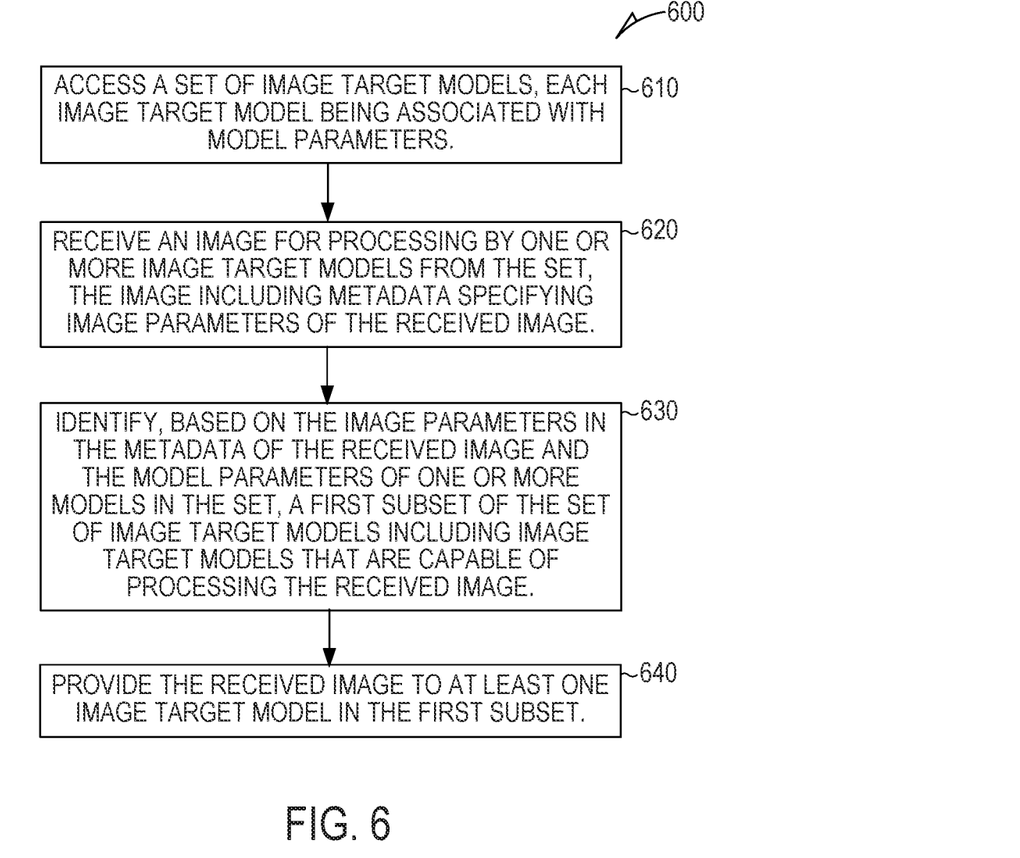
FIG. 6 is a flow chart of a method for operating an image target model broker, in accordance with some embodiments.

FIG. 6 is a flow chart of a method 600 for operating an image target model broker, in accordance with some embodiments. The method 600 may be implemented at a computing machine (e.g. the computing machine 500) or a combination of computing machines.

At operation 610, the computing machine accesses a set of image target models. Each image target model has its associated model parameters. The model parameters describe the type of models on which the image target model has been trained or is optimized to perform. The model parameters may include at least an operational domain, an expected input image quality, and an expected orientation. The operational domain specifies a target type (e.g. a car, a truck, a boat, an airplane, a tank, and the like). The expected input image quality may include a resolution or a modulation transfer function (i.e., the reduction in quality caused by the optical system). The expected orientation may include overhead, oblique or horizontal or terrestrial viewing. Each image target model may include a neural network (or another architecture) for identifying a specified target or type of target in an input image.

Some image target models include neural networks. However, some non-neural network models may still exist using other algorithms, for example, statistical inference and/or bulk processing. The image target model broker may be used for both neural network-based and non-neural network-based models. In some aspects, the image target model broker is agnostic of the technology of the image target models. In some embodiments, the model parameters may actually include the type of the machine learning approach used in creating the model. For example, if neural networks are better at distinguishing between cats and dogs, while Bayesian algorithms are better at distinguishing type of biological cells in images, this information may be used by the image target model.

At operation 620, the computing machine receives an image for processing by one or more image target models from the set. The image includes (e.g. in its header) metadata specifying image parameters of the received image. The received image may be an image file or another data structure storing the visual data and the metadata of the image as described herein. The received image may have a format that specifies the metadata contained in the received image. The format may be National Imagery Transmission Format (NITF), Georeferenced Tagged Image File Format (GEOTIFF), Environment for Visualizing Images (ENVI) or a custom format. The metadata may identify one or more of: a resolution of the image, a ground sample distance (GSD) of the image, an edge response of the image, and a calibration parameter of the image. The image parameters may include at least a geographic location, an image quality, and a viewing orientation.

The metadata may reside within the header of the image. The header may be an intelligence, surveillance and reconnaissance (ISR) header or any other type of header. In some cases, an ISR (or other) header that includes the metadata is used. Alternatively, the metadata may be attached to the image in another manner, for example, a JPEG or GIF image may be manually or automatically (e.g. by a camera or a server involved in uploading the image to the Internet) tagged with metadata such as the geographic location, the image quality, and/or the viewing orientation.

At operation 630, the computing machine identifies, based on the image parameters in the metadata of the received image and the model parameters of one or more models in the set, a first subset of the set of image target models including image target models that are capable of processing the received image. In some cases, the computing machine also identifies, based on the image parameters in the metadata of the received image and the model parameters of the one or more models in the set, a second subset of the set of image target models including image target models that are not capable of processing the received image.

According to some implementations, identifying the first subset of the set of image target models includes determining that: the geographic location of the received image corresponds to the operational domain of the image target models in the first subset, the image quality of the received image corresponds to the expected input image quality of the image target models in the first subset, and the viewing orientation of the received image corresponds to the expected orientation of the image target models in the first subset. For example, a battleship target is unlikely to be identified in an image taken over land and a truck target is unlikely to be identified in an image taken over an ocean.

At operation 640, the computing machine provides the received image to at least one image target model in the first subset. The computing machine foregoes providing the received image to at least one image target model in the second subset.

The image target model(s) in the first subset may use the received image for training and/or inference. In the inference case, an image target model in the first subset determines whether the received image includes a target and provides an output representing whether the received image includes the target. In the training case, an image target model in the first subset receives a representation indicating whether the received image includes a target and trains a neural network (or other modeling architecture) to identify the target in visual data using at least the received image and the received representation.

In some aspects, the target model broker performs, among other things, two basic tasks. A first task is to register the individual image target models available within the model repository along with information describing each individual image target model's operational domain (e.g. target types, such as trucks, planes, boats, and the like) image quality (e.g. resolution and modulation transfer function), and expected sensor/target orientation (e.g. overhead, oblique or terrestrial viewing). A second task is to filter the stream of images access to target models based upon their location, image quality, and viewing orientation as described by the information in their individual metadata. In some cases, the metadata is contained within the image's header information.

Reading image metadata is very efficient as the data are small and arranged in a structured format. Therefore filtering a stream of a large volume images can be performed without adding latency for decision rendering into the processing workflow. Additionally, the filtering reduces the overall processing burden and therefore the resources used to commit to exploitation.

Figure 7:
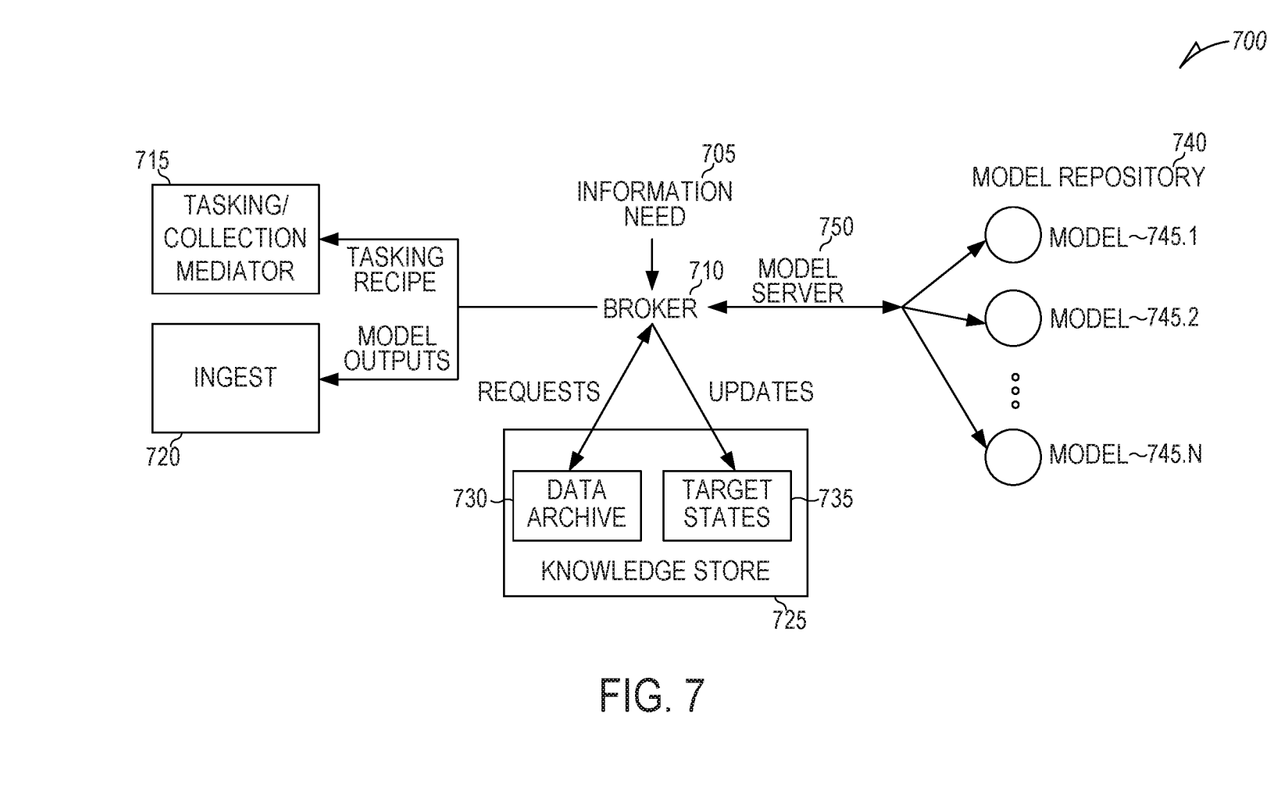
FIG. 7 is a first data flow diagram for operation of an image target model broker, in accordance with some embodiments.

FIG. 7 is a first data flow diagram 700 for operation of an image target model broker, in accordance with some embodiments. As shown in the data flow diagram 700, an information need 705 is provided to an image target model broker 710. The broker 710 has access, via a model server 750, to a model repository 740. The model server 750 may be a NVIDIA® model server developed by NVIDIA Corporation of Santa Clara, Calif. The model repository stores a set of image target models 745.1-N.

In its operation, the broker 710 provides a tasking recipe to tasking/collection mediator engine 715 and provides model outputs to an ingest engine 720. The broker 710 operates in conjunction with a knowledge store 725 that includes a data archive 730 and target states 735. The broker 710 receives requests from the data archive 730 and provides updates to the target states 735.

In some implementations, the broker 710 receives an action by the information need 705 (e.g., perform classification among a group of trucks, detect stars on buildings patio, recognize the difference between a prop and a jet airplane, and the like). The broker 710 reviews its data store to determine whether a target model exists within the model repository 740. If a target model exists, the broker 710 looks in the data archive 730 to determine if an appropriate image is available (the relevant factors may include image quality, environment, location, sensor type, and the like). This check is performed very quickly using the information from the image header (e.g., metadata) and, in some cases, no other information about the image (which may require more time or processing resources to gather).

If a target model does not exist, and if the broker 710 is attached to an automated closed loop ISR system, the broker 710 may request image collection (e.g., generate a tasking recipe and go through the tasking/collection mediator 715) to satisfy the information need 705. If a target model does not exist, and if the broker 710 is not connected to a closed loop ISR system, the broker 710 generates a message indicating that the information need 705 cannot be satisfied.

When the information need 705 can be satisfied and relevant data exist, the broker 710 pulls the data from the archive and submits it to the model server 750 along with the other information that the model server needs to select the appropriate model (plus a tag to match the submission to the information need 705). The broker 710 receives the outputs from its request to the model server 750 and, when relevant, updates the target states 735 and/or passes the outputs to the ingest 720. In some cases, before data is pushed to one or more of the image target models 745.1-N, the data is determined to be relevant to the image target model(s) 745.1-N to which they are being pushed. The data may include streaming images (e.g., from ISR collections). The net result includes finding images that are likely to have a given target (e.g., a tanker ship) in them (e.g. over water, specific quality, and relevant to the image target model(s) 745.1-N for identifying tanker ships).

Figure 8:
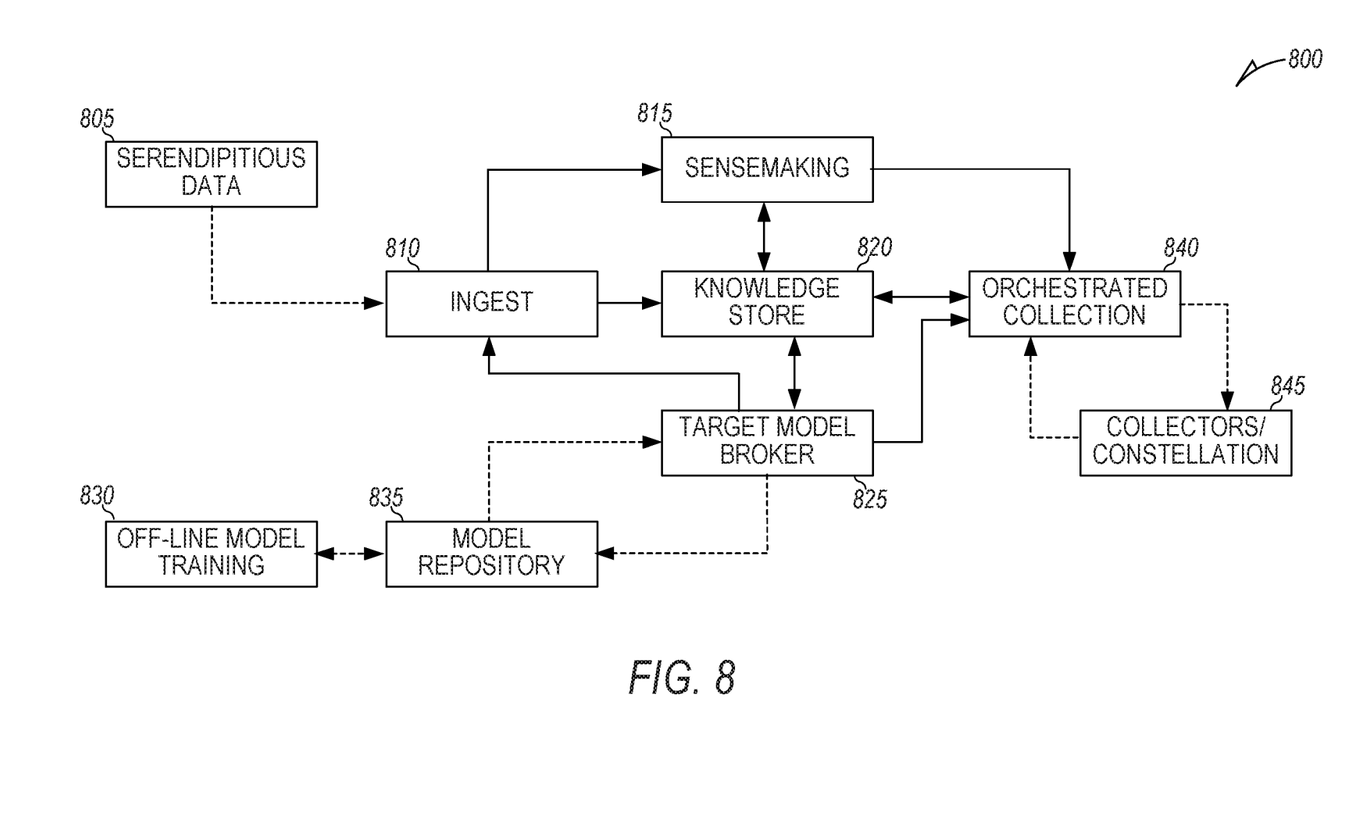
FIG. 8 is a second data flow diagram for operation of an image target model broker within an automated closed loop collection and exploitation system, in accordance with some embodiments.

FIG. 8 is a second data flow diagram 800 for operation of an image target model broker within an automated closed loop collection and exploitation system, in accordance with some embodiments. As shown in the data flow diagram 800, serendipitous data 805 is provided to an ingest engine 810. The ingest engine 810 collects data from multiple sources, including the serendipitous data 805, and forwards the data to a sensemaking engine 815 and a knowledge store 820. The sensemaking engine 815 and the knowledge store 820 are in communication with one another.

As further shown in the data flow diagram 800, off-line model training 830 trains image target models stored in a model repository 835. The model repository 835 corresponds to the model repository 740 of FIG. 7. The model repository communicates with a target model broker 825. The target model broker 825 is also coupled with the knowledge store 825 and provides data to the ingest engine 810. The target model broker 825 also communicates data to an orchestrated collection 840. The orchestrated collection 840 is coupled with the knowledge store 820 and communicates with multiple collectors/constellation 845. The target model broker 825 collects actionable requests from the surrounding system.

In FIG. 8, the system is set up to monitor its area of interest (AOI). The system's state is changed by information—either some serendipitous data 805 or from the output of the target model broker 825. A hypothesis is generated that needs to be confirmed or rejected. The serendipitous data 805 is ingested 810 by the system. The sensemaking 815 holds at least one hypothesis (generates, confirms, and rejects as necessary) and evaluates all information relating to each hypothesis. The state of each hypothesis, whether active or archived, is held in the knowledge store 820 along with all the raw data and the outputs from the primary processing by the target model broker 825.

For each hypothesis, the sensemaker 815 generates the information needs based upon the hypothesis so that it can accept or reject hypothesis. A hypothesis may include a threat or concept. A hypothesis may answer questions such as are Russian planes crossing the Canadian border, or is there a school shooting.

The information need describes the information that is missing to confirm or reject the hypothesis. The target model broker 825 decomposes the information need to parameterize the type of imagery needed to, for example, identify a Russian plane, identify a person carrying a firearm, and the like. This allows the system to evaluate the existing archive or request a new collection via orchestrated collection 840 and collectors/constellation 845.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, user equipment (UE), article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. An image target model brokering apparatus, the apparatus comprising:
   processing circuitry and memory;
   the processing circuitry configured to:
   access a set of image target models, each image target model being associated with model parameters, the model parameters comprising at least an operational domain, an expected input image quality, and an expected orientation;
   receive an image for processing by one or more image target models from the set, the image including metadata specifying image parameters of the received image;
   identify, based on the image parameters in the metadata of the received image and the model parameters of one or more models in the set, a first subset of the set of image target models including image target models that are capable of processing the received image and a second subset of the set of image target models including image target models that are not capable of processing the received image; and
   provide the received image to at least one image target model in the first subset and forego providing the received image to at least one image target model in the second subset;
   wherein the image parameters comprise at least a geographic location, an image quality, and a viewing orientation, and
   wherein identifying the first subset of the set of image target models including the image target models that are capable of processing the received image comprises determining that:
      the geographic location of the received image corresponds to the operational domain of the image target models in the first subset,
      the image quality of the received image corresponds to the expected input image quality of the image target models in the first subset, and
      the viewing orientation of the received image corresponds to the expected orientation of the image target models in the first subset.

2. The apparatus of claim 1, wherein the operational domain specifies a target type.

3. The apparatus of claim 2, wherein the target type comprises a list of one or more of: a car, a truck, a boat, an airplane, and a tank.

4. The apparatus of claim 1, wherein the expected input image quality comprises a resolution or a modulation transfer function.

5. The apparatus of claim 1, wherein the expected orientation comprises overhead, oblique or terrestrial viewing.

6. The apparatus of claim 1, wherein the processing circuitry is further to:
   determine, using the at least one image target model, whether the received image includes a target; and
   provide an output representing whether the received image includes the target.

7. The apparatus of claim 1, wherein the processing circuitry is further to:

receive a representation indicating whether the received image includes a target; and train a neural network to identify the target in visual data using at least the received image and the received representation.

8. The apparatus of claim 1, wherein each image target model in the set comprises a neural network for identifying a specified target in an input image.

9. The apparatus of claim 1, wherein the received image has a format that specifies the metadata contained in the received image.

10. The apparatus of claim 9, wherein the format is National Imagery Transmission Format (NITF), Georeferenced Tagged Image File Format (GEOTIFF) or Environment for Visualizing Images (ENVI).

11. The apparatus of claim 1, wherein the metadata identifies one or more of: a resolution of the image, a ground sample distance (GSD) of the image, an edge response of the image, and a calibration parameter of the image.

12. The apparatus of claim 1, wherein the metadata resides within an intelligence, surveillance and reconnaissance (ISR) header.

13. The apparatus of claim 1, wherein the image parameters comprise at least a geographic location, an image quality, and a viewing orientation.

14. An image target model brokering apparatus, the apparatus comprising: processing circuitry and memory; the processing circuitry configured to:

access a set of image target models, each image target model being associated with model parameters, the model parameters comprising at least an operational domain, an expected input image quality, and an expected orientation;

receive an image for processing by one or more image target models from the set, the image including metadata specifying image parameters of the received image;

identify, based on the image parameters in the metadata of the received image and the model parameters of one or more models in the set, a first subset of the set of image target models including image target models that are capable of processing the received image; and provide the received image to at least one image target model in the first subset, wherein the image parameters comprise at least a geographic location, an image quality, and a viewing orientation, and wherein identifying the first subset of the set of image target models including the image target models that are capable of processing the received image comprises determining that:

the geographic location of the received image corresponds to the operational domain of the image target models in the first subset, the image quality of the received image corresponds to the expected input image quality of the image target models in the first subset, and the viewing orientation of the received image corresponds to the expected orientation of the image target models in the first subset.

15. A non-transitory machine-readable medium storing instructions which, when executed by processing circuitry of one or more machines, cause the processing circuitry to:

access a set of image target models, each image target model being associated with model parameters, the model parameters comprising at least an operational domain, an expected input image quality, and an expected orientation;

receive an image for processing by one or more image target models from the set, the image including metadata specifying image parameters of the received image;

identify, based on the image parameters in the metadata of the received image and the model parameters of one or more models in the set, a first subset of the set of image target models including image target models that are capable of processing the received image and a second subset of the set of image target models including image target models that are not capable of processing the received image; and provide the received image to at least one image target model in the first subset and forego providing the received image to at least one image target model in the second subset;

wherein the image parameters comprise at least a geographic location, an image quality, and a viewing orientation, and wherein identifying the first subset of the set of image target models including the image target models that are capable of processing the received image comprises determining that:

the geographic location of the received image corresponds to the operational domain of the image target models in the first subset, the image quality of the received image corresponds to the expected input image quality of the image target models in the first subset, and the viewing orientation of the received image corresponds to the expected orientation of the image target models in the first subset.

16. The machine-readable medium of claim 15, wherein the operational domain specifies a target type.

17. The machine-readable medium of claim 16, wherein the target type comprises a list of one or more of: a car, a truck, a boat, an airplane, and a tank.

18. The machine-readable medium of claim 15, wherein the expected input image quality comprises a resolution or a modulation transfer function.

19. An image target model brokering method, the method comprising:

accessing a set of image target models, each image target model being associated with model parameters, the model parameters comprising at least an operational domain, an expected input image quality, and an expected orientation;

receiving an image for processing by one or more image target models from the set, the image including metadata specifying image parameters of the received image;

identifying, based on the image parameters in the metadata of the received image and the model parameters of one or more models in the set, a first subset of the set of image target models including image target models that are capable of processing the received image and a second subset of the set of image target models including image target models that are not capable of processing the received image; and providing the received image to at least one image target model in the first subset and foregoing providing the received image to at least one image target model in the second subset;

wherein the image parameters comprise at least a geographic location, an image quality, and a viewing orientation, and wherein identifying the first subset of the set of image target models including the image target models that are capable of processing the received image comprises determining that:
- the geographic location of the received image corresponds to the operational domain of the image tar et models in the first subset,
- the image quality of the received image corresponds to the expected input image quality of the image target models in the first subset, and
- the viewing orientation of the received image corresponds to the expected orientation of the image target models in the first subset.

\* \* \* \* \*